Feb. 24, 1959
R. G. DURNAL
2,875,333
CIRCUIT MEANS FOR GENERATING SUCCESSIVE OUTPUT
VOLTAGES OF UNEQUAL TIME DURATION
Filed Feb. 25, 1955
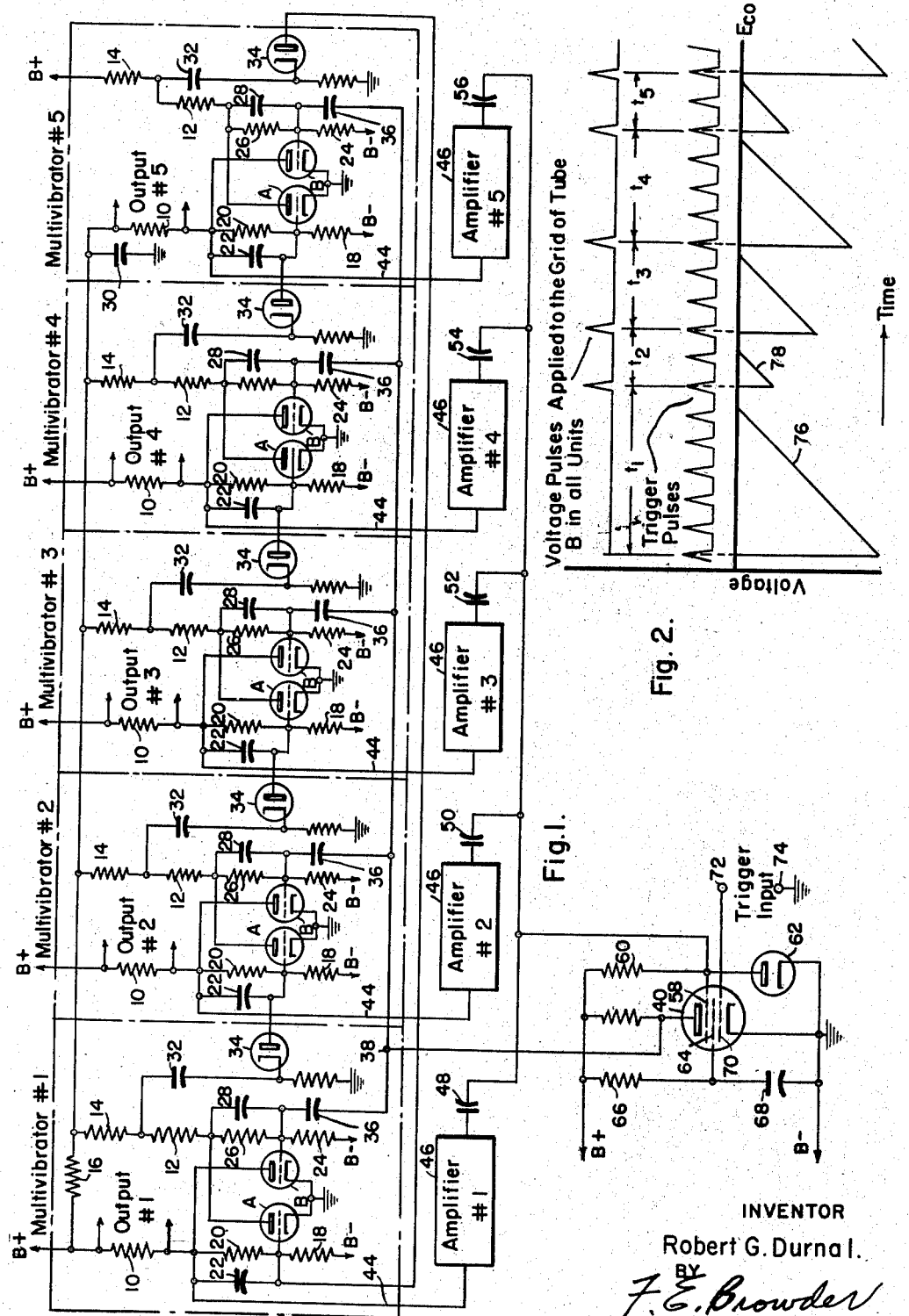
Fig. 1.
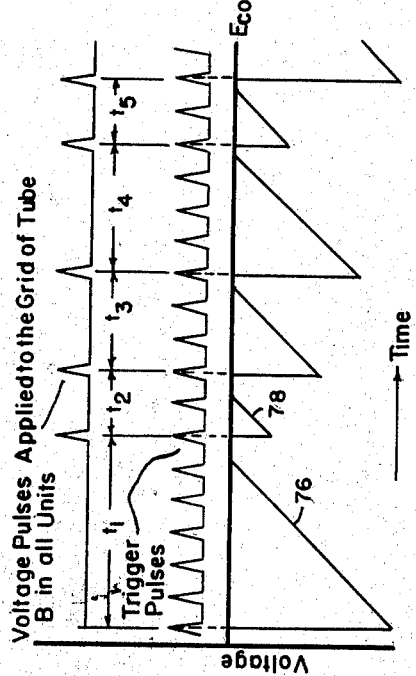
Fig. 2.
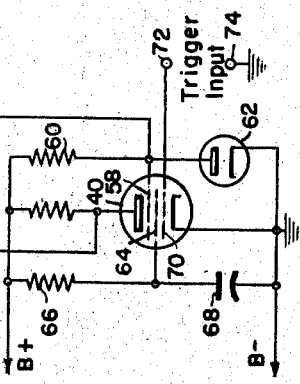
INVENTOR
Robert G. Durnal.
BY
F. E. Browder
ATTORNEY

United States Patent Office 2,875,333
Patented Feb. 24, 1959

2,875,333

CIRCUIT MEANS FOR GENERATING SUCCESSIVE OUTPUT VOLTAGES OF UNEQUAL TIME DURATION

Robert G. Durnal, Catonsville, Md., assignor to Westinghouse Electric Corporation, East Pittsburgh, Pa., a corporation of Pennsylvania Application February 25, 1955, Serial No. 490,461

11 Claims. (Cl. 250—27)

This invention relates to control apparatus for rendering a plurality of electrical utilization devices operative sequentially and, more particularly, to means of the type described in which the sequential operation recycles after each of the utilization devices is rendered operative in succession.

In certain installations, it may be desirable to render a plurality of electrical devices operative sequentially for unequal time durations. Considering a plurality of electrical devices A, B and C, it may be required in a particular case to render A operative for one time increment $t_1$ followed by operation of B for another time increment $t_2$, the operation of B being succeeded by operation of C for still another time increment $t_3$, and so on. In a radar system, for example, it may be desirable to apply radar search returns to a radar indicating scope for one time increment, an artificial horizon signal for another time increment, and turn and bank indications for still another time increment. Obviously, if the various signals are to be applied to the radar scope in succession, some means must be provided for controlling, in the manner described above, the various devices generating these signals.

Accordingly, it is an object of my invention to provide means for rendering a plurality of electrical devices operative sequentially for unequal time durations. Although only three utilization devices have been used in the illustration given above, it will become apparent as the following description proceeds that the number of devices may be extended indefinitely according to requirements.

It is another object of my invention to provide means for rendering a plurality of electrical devices operative sequentially in which the sequential operation recycles automatically after each of the electrical devices has been rendered operative in succession.

A further object of my invention is to provide means of the type described above in which the unequal time intervals are always multiples of a predetermined time elapse.

A still more general object of my invention is to provide apparatus having a plurality of output load impedances in which control voltages are generated across said impedances in sequences and in which the sequential operation of the apparatus recycles periodically.

In accordance with my invention, I provide a ring counter composed of $n$ identical units or bistable multivibrators, $n$ being equal to 5 in this case. Each unit of the ring counter has two stable states which, for purposes of explanation, may be designated by "on" and "off." The ring counter is controlled by a series of spaced voltage pulses which are applied simultaneously to all units, and the units are so interrelated that a voltage pulse will turn a unit "on" only if the unit immediately preceding it in the ring is "on" at the time the pulse is applied. Moreover, the interrelationship of the units makes it possible for only one unit to be "on" at a time. At the time each pulse is received, the "on" unit will move from one unit to the next succeeding unit around the ring. The ring counter is such that an output voltage may be obtained from each of the units when it is in "on" condition. These output voltages may then be used to render a plurality of electrical utilization devices operative (or inoperative) in succession.

To control the ring counter, I have provided a pulse generator which produces voltage pulses separated by unequal time durations. These voltage pulses constitute the series of pulses, referred to above, which are applied to all of the units of the ring counter simultaneously. The time duration between the pulses may be conveniently adjusted to thereby control the time duration of the "on" condition of each of the units. In this manner, the time during which each of the aforesaid utilization devices is rendered operative in succession is controlled.

Detailed operation of my invention, together with further objects and features thereof, may best be understood by reference to the following description taken in connection with the accompanying drawings which form a part of this specification, and in which:

Figure 1 is a schematic circuit diagram of the invention; and

Fig. 2 is a graphical illustration of the operation of the invention.

Referring to Fig. 1, the circuit illustrated includes a ring counter which comprises the major portion of the circuitry shown at the top portion of the drawing. Each of the units or multivibrators in the ring counter has two vacuum tubes A and B included therein. Since all of the multivibrators are identical in construction only one will be described in detail. Corresponding elements in the various multivibrators are designated by like reference numerals. Referring to multivibrator No. 1, it can be seen that the cathodes of tubes A and B are both connected directly to ground. The plate of tube B is connected to the positive terminal of a source of anode voltage, not shown, through resistor 10; whereas the plate of tube A is connected to this same positive terminal through resistors 12, 14 and 16. The grid of tube A is connected to the negative terminal of an anode voltage source, not shown, through resistor 18 and to the positive terminal through resistors 10 and 20, resistor 20 being bypassed by capacitor 22. In a similar manner, the grid of tube B is connected to the negative terminal of the anode voltage source through resistor 24 and to the positive terminal of the anode voltage source through resistors 12, 14, 16 and 26, with resistor 26 being bypassed by capacitor 28. It should be noted that the plate of tube A is connected to the grid of tube B through capacitor 28 and resistor 26. Likewise, the plate of tube B is connected to the grid of tube A through capacitor 22 and resistor 20.

When a source of anode voltage is applied to this multivibrator, current will tend to flow in the plate circuits of tubes A and B. If the two halves of the circuits are identical, the tube currents will be nearly equal at first. However, a perfect balance is always impossible; and, as will become apparent from the following description, means are provided to insure that one of the tubes initially conducts more heavily than the other. This initial difference in conduction brings about a cumulative increase in the unbalance as follows: It will be assumed that tube A initially conducts more heavily than tube B. The increased current through tube A causes an increase in the voltage drop across resistors 12 and 14 and, thus, a decrease in the plate voltage of tube A. Because of the connection between the plate of tube A and the grid of tube B, the decrease in the plate voltage of tube A is accompanied by a decrease in the grid voltage of tube B. Thus, an increase in the plate current of tube A must be accompanied by a decrease in the plate current of tube B since its grid is now driven negative. Moreover, a decrease of plate current through tube B causes an increase of the grid voltage of tube A and, consequently, results in a further increase of plate current through tube A. In this manner, a slight initial unbalance sets up a cumulative or regenerative switching action which reduces the plate current of tube B to zero and increases the plate current of tube A to a maximum. Though described as if it occurred slowly, this switching action occurs with extreme rapidity—in a fraction of a microsecond in most multivibrators.

It is important to note that the grid of tube A in multivibrators 1, 2, 3 and 4 is connected through resistors 10 and 20 to the positive terminal of the anode voltage source; whereas, the grid of tube B in all of these multivibrators is connected to the positive terminal through resistors 26, 12, 14 and 16. In multivibrator No. 5, however, this configuration is reversed. That is, the grid of tube B is connected through resistors 26, 12, and 14 to the positive terminal of the anode voltage source; whereas, the grid of tube A is now connected to the same positive terminal through resistor 16. Resistor 16 and capacitor 30 form an RC circuit having a relatively long time constant. When plate current is initially applied to the multivibrators, the grid of tube A in multivibrators 1–4, and the grid of tube B in multivibrator No. 5 will swing positive almost instantaneously. However, because of the long time constant of resistor 16 and capacitor 30, a certain time delay will be involved before the positive voltage from the anode voltage supply can take effect on the grid of tube B in multivibrators 1–4 and tube A in multivibrator No. 5. This time relay sets up an unbalance which causes tube A in multivibrators 1–4 and tube B in multivibrator No. 5 to conduct initially. Thus, the regenerative switching action of the multivibrators results in maximum conduction through tube A and zero plate current through tube B in multivibrators 1–4. In multivibrator No. 5, however, this condition will be reversed with the plate current through tube B being at a maximum, and the plate current through tube A being zero.

The plate of tube A in each of the multivibrators is connected through resistor 12, a capacitor 32, and rectifier 34 to the grid of tube A in the next succeeding multivibrator. It will become apparent as the description proceeds that with this connection the "on" unit of the ring counter is changed to the next succeeding multivibrator in the unit when a voltage pulse is simultaneously applied to all of the multivibrators.

The voltage pulses which control the ring counter are applied to the grid of tube B in each of the multivibrators through a capacitor 36. All of the capacitors are connected to a common terminal 38, and this terminal is, in turn, connected to the plate of a dual control pentode vacuum tube 40. The plate of tube B in each of the multivibrators is connected through circuit path 44 to an associated isolation amplifier 46. The term "isolation amplifier" is used herein since the amplifier will pass signals in one direction through the circuit but will prevent signals from being transmitted in the opposite direction. Each of these isolation amplifiers 46 is connected through unequal capacitors 48, 50, 52, 54 and 56 to the suppressor grid 58 of pentode 40. Suppressor grid 58 is connected to a source of positive anode voltage, not shown, through resistor 60 and to ground through diode 62. The screen grid 64 of pentode 40 is connected to the positive terminal of the anode voltage source through resistor 66 and to the negative terminal through capacitor 68. With this arrangement, suppressor grid 58 is biased negative with respect to the cathode of the pentode, and screen grid 64 is biased positive with respect to the cathode. A source of periodic voltage pulses (trigger pulses) are applied to control grid 70 of pentode 40 through input terminals 72 and 74.

Operation of the invention is as follows: When the anode voltage supply is first connected to multivibrators 1–5, tube A in multivibrators 1–4 and tube B in multivibrator No. 5 will first conduct in accordance with the explanation given above. Under these conditions, multivibrator No. 5 will be "on" and the other multivibrators will be "off." The amplitude of the trigger pulses applied to input terminals 72 and 74 is such that in the absence of a negative bias applied to suppressor grid 58 by one of the amplifiers 46, pentode 40 will conduct to apply a negative voltage pulse to the grid of tube B in each multivibrator. This negative pulse, being applied to the grid of tube B in multivibrator No. 5, will shut off tube B and will initiate conduction in tube A in accordance with the regenerative switching action previously described. When tube A begins to conduct, a negative voltage pulse will be applied through capacitor 32 and rectifier 34 in multivibrator No. 5 to the grid of tube A in multivibrator No. 1. Hence, in multivibrator No. 1, tube A will cease conducting and tube B will begin conducting. Now multivibrator No. 1 is in "on" condition. Since an input terminal of amplifier No. 1 is connected to the plate of tube B in multivibrator No. 1 (the other terminal being grounded), the amplifier will have an increased output voltage when tube B begins to conduct which will be applied through capacitor 48 to capacitors 50–56. The magnitude of the charge on the capacitors is determined by the ratio of the capacity of capacitor 48 to the capacity of capacitors 50–56 in parallel. Thus, after each multivibrator switches from one stable condition to the other, a negative pulse will appear on the suppressor grid 58 of pentode 40. This pulse decays at a rate determined by resistor 60, the capacity of capacitors 48–56 in parallel, the pulse amplitude (which is determined by the capacity ratio), and the magnitude of the anode voltage supply. Mathematically, this can be expressed by $$(E_{bb}+E_p)e^{-t/R_1C_t}=E_{bb}+E_{co}$$

where $E_{bb}$ is the anode voltage supply, $E_p$ is the pulse amplitude from amplifiers 46, $R_1$ is the value of resistor 60, $C_t$ is the total capacity of capacitors 48–56 in parallel, and $E_{co}$ is the voltage on grid 58 below which tube 40 will be cut off. The time that pentode 40 is cut off is then $$t=R_1C_t\log_e\frac{E_{bb}+E_p}{E_{bb}+E_{co}}$$

When the time $t$ has elapsed and the bias on suppressor grid 50 returns to a value above $E_{co}$, the trigger pulses applied to input terminals 72 and 74 will cause pentode 40 to conduct to thereby apply a negative voltage pulse on the grid of tube B in all of the multivibrators. This action will cause the "on" multivibrator to shift from multivibrator No. 1 to multivibrator No. 2 where tube B will now be conducting and tube A will be cut off.

Operation of the invention is graphically illustrated in Fig. 2. The time duration of the "on" condition of a multivibrator is determined by the capacity ratio of the capacitor associated with amplifier 46 of the "on" multivibrator to the other capacitors. When multivibrator No. 1 is initially in the "on" condition, capacitors 48–56 will charge up almost instantaneously. The capacitors will then discharge along the line 76 until the voltage $E_{co}$ is reached, at which time the amplitude of the trigger pulses applied to input terminals 72 and 74 will be sufficient to overcome the bias on grid 58 and cause pentode 40 to conduct. The slope of line 76 is determined by the time constant of resistor 60 and capacitors 48–56 in parallel.

If diode 62 were not included in the circuit, the voltage on suppressor grid 58 would rise above ground as capacitors 48–56 discharge because grid 58 is connected to the positive terminal of the anode voltage source through resistor 60. When a voltage pulse is received from one of the amplifiers 46, the negative voltage on grid 58 will bias diode 62 in the reverse direction. However, when the charge on the capacitors decays to zero or ground potential, the reverse bias on the diode is removed and it conducts to maintain grid 58 at ground potential.

When the next multivibrator shifts to the "on" condition, the duration of its "on" interval will be determined by the ratio of the capacity of capacitor 50 to the capacity of capacitors 48, 52, 54 and 56 in parallel. This ratio is much less than the ratio for the first voltage pulse from amplifier No. 1. Therefore, the negative voltage applied to suppressor grid 58 is not as great as it was in the case of multivibrator No. 1. Consequently, the time required for capacitors 48–56 to discharge is also not as great. However, it should be noted that the rate of discharge is the same. That is, the slope of line 78 is the same as that of line 76. This is due to the fact that the time constant of the resistor 60 and capacitors 48–56 in parallel is always the same. In a similar manner, the time duration of the "on" condition of multivibrators 3, 4 and 5 is determined by the effective capacity ratio when their associated isolation amplifier conducts.

An alternative mode of operation would be to have the capacitors 48–56 all of the same value, thereby giving the same capacity ratio for each multivibrator. By varying the amplification of amplifiers 46, the magnitude of the voltage applied to suppressor grid 58 could then be made to differ for each amplifier. The end result will be the same as illustrated in Fig. 2 with the rate of discharge being the same in each case. Only the time duration of the discharge of the capacitors will be affected by the amplification of the various amplifiers.

It should be noted that the beginning and end of the "on" condition of the multivibrators must always be in synchronism with the trigger pulses applied to input terminals 72 and 74. That is, regardless of the time required for capacitors 48–56 to discharge through resistor 60, the "on" multivibrator will not be switched to the next succeeding multivibrator in the ring counter until a trigger pulse is received at input terminals 72 and 74. If the time duration of the discharge of capacitors 48–56 is chosen so that the voltage on grid 58 reaches $E_{co}$ between the time of the $n$th and the $n-1$st trigger pulse, then the $n$th trigger pulse will be passed to the ring counter, but not the $n-1$st. This factor is illustrated in Fig. 2. Note that the capacitors do not charge again after $E_{co}$ is reached until a trigger pulse is received from pentode 40.

The output voltage across resistor 10 in each of the multivibrators may be applied to five different electrical utilization devices. Thus, the electrical device controlled by the voltage across resistor 10 in multivibrator No. 1 will be rendered operative (or inoperative) during the time $(t_1)$ that multivibrator No. 1 is in "on" condition; the electrical device controlled by the voltage across resistor 10 in multivibrator No. 2 will be rendered operative during the time $(t_2)$ that multivibrator No. 2 is in "on" condition, and so on. The time of the "on" condition of each of the multivibrators may be conveniently adjusted by varying the capacity ratio of capacitors 48–56 or the amplification factor of its associated amplifier 46 since, as is illustrated in Fig. 2, the time duration of the "on" condition of a multivibrator is directly proportional to the capacity ratio or the amplification effected by amplifiers 46.

Although I have described my invention in connection with a certain specific embodiment, it should be apparent to those skilled in the art that various changes in form and arrangement of parts can be made to suit requirements without departing from the spirit and scope of the invention.

I claim as my invention:

1. In combination, a plurality of bistable multivibrators each having first and second vacuum tubes included therein, an anode and a control electrode for each of said tubes, a plurality of rectifiers each of which couples the control electrode of the second tube in one of said multivibrators to the control electrode of the first tube in a succeeding multivibrator to thereby achieve a ring counter configuration, a plurality of isolation amplifiers each of which has an input terminal connected to the anode of the said second vacuum tube in an associated multivibrator, means for controlling operation of said multivibrators including a pentode vacuum tube having control, screen and suppressor grids included therein, means for coupling the anode of said pentode to the control electrode of the second tube in each of said multivibrators, capacitors coupling the outputs of said isolation amplifiers to the suppressor grid in said pentode, a unidirectional current device connecting the cathode of said pentode to said suppressor grid, and means for applying a control voltage to the control electrode of said pentode.

2. In combination, a plurality of bistable multivibrators each having first and second vacuum tubes included therein, an anode, a cathode and a control electrode for each of said tubes, means for coupling the control electrode of the second tube in each of said multivibrators to the control electrode of the first tube in a succeeding multivibrator to thereby achieve a ring counter configuration, a plurality of independent isolation amplifiers each of which has an input terminal connected to the anode of the said second vacuum tube in an associated multivibrator, means for controlling operation of said multivibrators including a pentode vacuum tube having its anode coupled to the control electrode of the second tube in each of said multivibrators, separate capacitors coupling the output of each of said isolation amplifiers to one of the grids in said pentode, and means for applying a control voltage to another of the grids in said pentode.

3. In combination, a plurality of bistable multivibrators each having first and second vacuum tubes included therein, an anode, a cathode and a control electrode for each of said tubes, means for coupling said multivibrators together to form a ring counter configuration, a plurality of amplifiers each of which has an input terminal connected to the anode of one of the tubes in an associated multivibrator, means for controlling the voltage on the control electrode of one of said two tubes in each of said multivibrators, said latter-mentioned means including an electron valve equipped with an electrically responsive control element, and a plurality of capacitors each of which couples the output of an associated one of said amplifiers to said control element.

4. In combination, a plurality of bistable multivibrators each having first and second vacuum tubes included therein, an anode, a cathode and a control electrode for each of said tubes, means for coupling said multivibrators together to form a ring counter configuration, a plurality of amplifiers each of which has an input terminal connected to the anode of one of the tubes in an associated multivibrator, means for controlling the voltage on the control electrode of one of said two tubes in each of said multivibrators, said latter-mentioned means including an electron valve, and capacitive means responsive to the output voltages from said amplifiers for controlling the operation of said electron valve.

5. In combination, a plurality of bistable multivibrators, means for coupling said multivibrators together to form a ring-counter configuration, a plurality of amplifiers each of which is connected to an associated multivibrator in a manner such that the voltage applied to the input terminals of each amplifier will vary when its associated multivibrator changes from one stable state to the other, means for controlling operation of said multivibrators including an electron discharge tube having a plurality of grids included therein, a plurality of capacitors each of which couples the output of an associated one of said amplifiers to one of said grids, and means for applying a control voltage to another of said grids.

6. In combination, a plurality of bistable multivibrators, means for coupling said multivibrators together to form a ring counter configuration, a plurality of amplifiers each of which is connected to an associated multivibrator in a manner such that the voltage applied to the input terminals of each amplifier will vary when its associated multivibrator changes from one stable state to the other, means for controlling operation of said multivibrators including an electron valve, said latter-mentioned means being such as to change a multivibrator from one stable state to another when current through said electron valve reaches a predetermined value, and capacitive means responsive to the outputs of said amplifiers for controlling said electron valve.

7. In combination, a plurality of bistable multivibrators, means for coupling said multivibrators together to form a ring counter configuration, a plurality of amplifiers each of which is connected to an associated multivibrator in a manner such that the voltage applied to the input terminals of each amplifier will vary when its associated multivibrator changes from one state state to the other, means for controlling operation of said multivibrators including a vacuum tube having at least one grid included therein, and a plurality of capacitors each of which couples the output of an associated one of said amplifiers to said grid.

8. In combination, a ring counter composed of *n* identical units each of which has two stable states, *n* amplifiers each of which is connected to an associated unit in a manner such that the input voltage applied to the amplifiers is changed when their associated unit changes from one stable state to the other, means for applying a control voltage to said units and including an electron valve, an electrically responsive element for controlling said electron valve, and a plurality of capacitors each of which couples the output of an associated one of said amplifiers to said control element.

9. In combination, a plurality of bistable multivibrators each having first and second vacuum tubes included therein, an anode, a cathode and a control electrode for each of said tubes, means for coupling the control electrode of the second tube in each of said multivibrators to the control electrode of the first tube in a succeeding multivibrator to thereby achieve a ring counter configuration, a plurality of independent isolation amplifiers each of which has an input terminal connected to the anode of the said second vacuum tube in an associated multivibrator, means for controlling operation of said multivibrators including a pentode vacuum tube having its anode coupled to the control electrode of the second tube in each of said multivibrators, separate capacitors coupling the output of each of said isolation amplifiers to one of the grids in said pentode, and means for applying a control voltage to another of the grids in said pentode, with the isolation amplifiers having different amplification factors.

10. In combination, a plurality of bistable multivibrators each having first and second vacuum tubes included therein, an anode, a cathode and a control electrode for each of said tubes, means for coupling the control electrode of the second tube in each of said multivibrators to the control electrode of the first tube in a succeeding multivibrator to thereby achieve a ring counter configuration, a plurality of indepenedent isolation amplifiers each of which has an input terminal connected to the anode of the said second vacuum tube in an associated multivibrator, means for controlling operation of said multivibrators including a pentode vacuum tube having its anode coupled to the control electrode of the second tube in each of said multivibrators, separate capacitors coupling the output of each of said isolation amplifiers to one of the grids in said pentode, and means for applying a control voltage to another of the grids in said pentode, with the coupling capacitors having different values.

11. In combination, a plurality of bistable multivibrators, means for coupling said multivibrators together to form a ring counter configuration, a plurality of amplifiers each of which is connected to an associated multivibrator in a manner such that the voltage applied to the input terminals of each amplifier will vary when its associated multivibrator changes from one stable state to the other, means for controlling operation of said multivibrators including a vacuum tube having at least one control grid included therein, and a plurality of capacitors each of which couples the output of an associated one of said amplifiers to said grid, with said means for coupling the outputs of said amplifiers to said control element comprising a predetermined time controlling RC circuit.

References Cited in the file of this patent

UNITED STATES PATENTS

| | | |
|---|---|---|
| 2,418,521 | Morton et al. | Apr. 8, 1947 |
| 2,485,886 | Johnstone et al. | Oct. 25, 1949 |
| 2,536,808 | Higinbotham | Jan. 2, 1951 |
| 2,568,918 | Grosdoff | Sept. 25, 1951 |
| 2,715,678 | Barney | Aug. 16, 1955 |